(12) United States Patent
Lindero et al.

(10) Patent No.: US 12,397,227 B2
(45) Date of Patent: Aug. 26, 2025

(54) SELECTING A PROCESSING UNIT TO SERVE A USER EQUIPMENT (UE)

(71) Applicant: Telefonaktiebolaget LM Ericsson (publ), Stockholm (SE)

(72) Inventors: David Lindero, Luleå (SE); Peter Ökvist, Luleå (SE); Tommy Arngren, Södra Sunderbyn (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 18/268,148

(22) PCT Filed: Dec. 17, 2020

(86) PCT No.: PCT/EP2020/086802
§ 371 (c)(1),
(2) Date: Jun. 16, 2023

(87) PCT Pub. No.: WO2022/128106
PCT Pub. Date: Jun. 23, 2022

(65) Prior Publication Data
US 2024/0058694 A1 Feb. 22, 2024

(51) Int. Cl.
*A63F 13/358* (2014.01)
*A63F 13/352* (2014.01)
(Continued)

(52) U.S. Cl.
CPC .......... *A63F 13/352* (2014.09); *A63F 13/355* (2014.09); *A63F 13/77* (2014.09)

(58) Field of Classification Search
CPC ........ A63F 13/20; A63F 13/31; A63F 13/332; A63F 13/35; A63F 13/352; A63F 13/355; A63F 13/358; A63F 13/77; G06F 9/50; H04L 29/06
See application file for complete search history.

(56) References Cited

U.S. PATENT DOCUMENTS 9,384,053 B2 * 7/2016 Suzuki ............... G06F 9/50
2017/0312626 A1 11/2017 Colenbrander
(Continued)

OTHER PUBLICATIONS

International Search Report and Written Opinion with Transmittal dated Oct. 26, 2021 issued in International Patent Application No. PCT/EP2020/086802 (21 pages).
Choi, K. et al., "Feasibility of the Computation Task Offloading to GPGPU-enabled Devices in Mobile Cloud", 2015 International Conference on Cloud and Autonomic Computing, IEEE, Sep. 21, 2015, XP032803009 (8 pages).
(Continued)

*Primary Examiner* — Omkar A Deodhar
(74) *Attorney, Agent, or Firm* — Sonoda & Kobayashi Intellectual Property Law; Sarvajit S. Patil

(57) ABSTRACT

A method (400) for selecting from a set of two or more available PUs (e.g. a set of GPUs or a set of TPUs) a PU to serve a UE (102) (i.e., select the "best" PU for the UE). The set of available PUs includes at least a first PU and a second PU. The method includes, for each PU included in the set of available PUs, obtaining (s402) performance information for the PU. The performance information for the first PU comprises a first time value indicating an estimated amount of time that it will take the first PU to produce a first result. The method also includes obtaining (s404) budget information for the UE, wherein the budget information comprises a threshold time value indicating a threshold amount of time. The method further includes selecting (s406) a PU from the set of available PUs based on the stored performance information and the budget information for the UE.

18 Claims, 7 Drawing Sheets

(51) Int. Cl.
  *A63F 13/355* (2014.01)
  *A63F 13/77* (2014.01)

(56) References Cited

U.S. PATENT DOCUMENTS

| | | | | |
|---|---|---|---|---|
| 2018/0288133 | A1* | 10/2018 | Colenbrander | A63F 13/35 |
| 2019/0334907 | A1* | 10/2019 | Rodden | H04L 67/54 |
| 2019/0342797 | A1 | 11/2019 | Fu et al. | |
| 2020/0346109 | A1* | 11/2020 | Kavallierou | A63F 13/48 |
| 2021/0008448 | A1* | 1/2021 | Kolen | G06N 5/04 |
| 2022/0100572 | A1* | 3/2022 | Floyd | G06F 9/4887 |

OTHER PUBLICATIONS

Ngo, M. V. et al., "Coordinated Container Migration and Base Station Handover in Mobile Edge Computing", IEEE, Dec. 7, 2020, XP033882569 (6 pages).
Fan, Q. et al., "Application Aware Workload Allocation for Edge Computing-Based IoT", IEEE Internet of Things Journal, vol. 5, No. 3, Jun. 1, 2018, IEEE, XP011685067 (8 pages).
Plachy, J. et al., "Dynamic Resource Allocation Exploiting Mobility Prediction in Mobile Edge Computing", 2016 IEEE 27th Annual IEEE International Symposium on Personal, Indoor and Mobile Radio Communications—(PIMRC): Mobile and Wireless Networks, Sep. 4, 2016, XP033035587 (6 pages).
"Asynchronous reprojection", Wikipedia, The Wayback Machine—https://web.archive.org/web/20201112003108/https://en.wikipedia.org/wiki/Asynchronous_reprojection, Jun. 8, 2023 (2 pages).

* cited by examiner

SELECTING A PROCESSING UNIT TO SERVE A USER EQUIPMENT (UE)

CROSS REFERENCE TO RELATED APPLICATIONS

This application is a 35 U.S.C. § 371 National Stage of International Patent Application No. PCT/EP2020/086802, filed Dec. 17, 2020.

TECHNICAL FIELD

This disclosure relates to selecting a processing unit (PU) (e.g., a PU that comprises or consists of a graphics processing unit (GPU) or a tensor processing unit (TPU)), to serve a user equipment (UE).

BACKGROUND

1. Graphic Processing Units (GPUs) and Cloud Gaming

The GPU has become an important type of computing technology, both for personal and business computing. GPUs are used in a wide range of applications, including graphics and video rendering. For example, GPUs are becoming popular for use in gaming (e.g., cloud gaming), remote rendering, extended reality (XR), and artificial intelligence (AI).

Cloud gaming and remote rendering involve employing a GPU (or a group of GPUs) that is remote from the user's UE to render high-fidelity images (e.g., video frames) of a game. The images are then transmitted from the GPU to the user's UE, which then displays the images to the user. The UE may also receive input from the user and transmit this user input to the GPU. An advantage of cloud gaming is that the GPUs that are "in the cloud" typically have much more rendering power than the user's UE (e.g. mobile phone or most desktop computer).

In some instances, the remote GPUs are owned by the company that sells the game or by an online gaming service provider (e.g., Google LLC, which provides an on-line gaming service known as Stadia). Accordingly, the remote GPUs are located outside of the user's premises (e.g., home or office) and sometimes not even in the same city or country as the user. In other instances, the remote GPU may be owned by the user. For example, a home streaming solution known as Steam allows a user to construct a system where a games is rendered on one of the user's devices, but the user plays the game on another one of the user's devices. Essentially, one of the user's device is a remote GPU that is accessible by UEs with the same user login on the same or different network.

It is expected that computers with competent GPUs will become ubiquitous. Gaming consoles in every living room, the workstation at the office, and even high-end tablets have a medium range GPU nowadays. Even cars, surveillance cameras and other non-computer devices are getting equipped with GPUs or TPUs for performing machine learning inferencing efficiently. There will likely be hundreds of available rendering devices in each parking lot in the future, being able to supply both storage and compute power for a multitude of thin UEs used by people in the vicinity (e.g., at sporting events).

SUMMARY

Certain challenges presently exist. For instance, services that use a remote processing unit (PU) (e.g., a GPU for rendering video frames that will be displayed on a device remote from the GPU) are sensitive to delay. For example, if the amount of time between the time at which a GPU receives an instruction to render a video frame and the time at which the video frame is received at the user's UE (i.e., the user's display device in this example) is greater than a threshold, then the user's quality-of-experience (QoE) may degrade significantly. The issue of delay become even more problematic when the user's UE is mobile because an event (e.g., mobility) might trigger a handover of the UE from a serving cell to a target cell, and such a handover usually adds latency (delay) because the UE may need to renegotiate settings with the target cell, update buffers, and/or setup a new data flow. With respect to XR services, latency spikes may cause severe degradation in the user's QoE by inducing "simulator sickness" or "cyber sickness" which are forms of motion sickness.

This disclosure aims to reduce such latency by, in one aspect, providing a method for selecting from a set of two or more available PUs (e.g. a set of GPUs or a set of TPUs) a PU to serve a UE (i.e., select the "best" PU for the UE). The set of available PUs includes at least a first PU and a second PU. The method includes, for each PU included in the set of available PUs, obtaining performance information for the PU. The performance information for the first PU comprises a first time value indicating an estimated amount of time that it will take the first PU to produce a first result. The method also includes obtaining budget information for the UE, wherein the budget information comprises a threshold time value indicating a threshold amount of time. The method further includes selecting a PU from the set of available PUs based on the stored performance information and the budget information for the UE.

In another aspect there is provided a computer program comprising instructions which when executed by processing circuitry of a PU selection function (PSF) causes the PSF to perform the method. In another aspect there is provided a carrier containing the computer program, wherein the carrier is one of an electronic signal, an optical signal, a radio signal, and a computer readable storage medium.

In another aspect there is provided a PSF, where the PSF is adapted to perform the method of any PSF embodiments disclosed herein. In some embodiments, the PSF includes processing circuitry; and a memory containing instructions executable by the processing circuitry, whereby the PSF is operative to perform the PSF methods disclosed herein.

In another aspect there is provided a method performed by a UE. The method includes the UE providing user input information to a serving PU that is configured to use the user input information to produce a result (e.g., generate a video frame or produce an inference) and provide the result to an application running on the UE. The method also includes the UE detecting a PU related event. In response to detecting the PU related event, the UE performs the step of transmitting a PU quality measurement report to a PU selection function. After transmitting the PU quality measurement report to the PU selection function, the UE received a PU handover message comprising PU identifier information identifying a selected PU that was selected by the PU selection function.

In another aspect there is provided a computer program comprising instructions which when executed by processing circuitry of a UE, causes the UE to perform the method. In another aspect there is provided a carrier containing the computer program, wherein the carrier is one of an electronic signal, an optical signal, a radio signal, and a computer readable storage medium.

In another aspect there is provided a UE, where the UE is adapted to perform the method of any UE embodiments disclosed herein. In some embodiments, the UE includes processing circuitry; and a memory containing instructions executable by the processing circuitry, whereby the UE is operative to perform the UE methods disclosed herein.

An advantage of the embodiments disclosed herein is that an optimal PU can be selected to serve a UE (e.g., a thin client and/or battery dependent device), and, therefore, the latency can be reduced, which will lead to higher QoE for the user as well as potentially increasing the battery life of the user's UE. In one aspect, by providing to the PU selection functions within the network information about PUs that are available to a given UE (e.g., performance information, load information, etc.) the PU selection function can pre-configure and prepare appropriate PUs to minimize, and possibly eliminate, any negative side-effects of handover between radio cells, thereby further reducing latency. Accordingly, in some embodiments, executing a cellular handover from a source cell to a target cell is based not only on radio measurements, but also based on the UE's processing (e.g., video rendering) requirements and/or information about the PUs at target cell or available to the UE via the target cell.

BRIEF DESCRIPTION OF THE DRAWINGS

The accompanying drawings, which are incorporated herein and form part of the specification, illustrate various embodiments.

DETAILED DESCRIPTION

Figure 1:
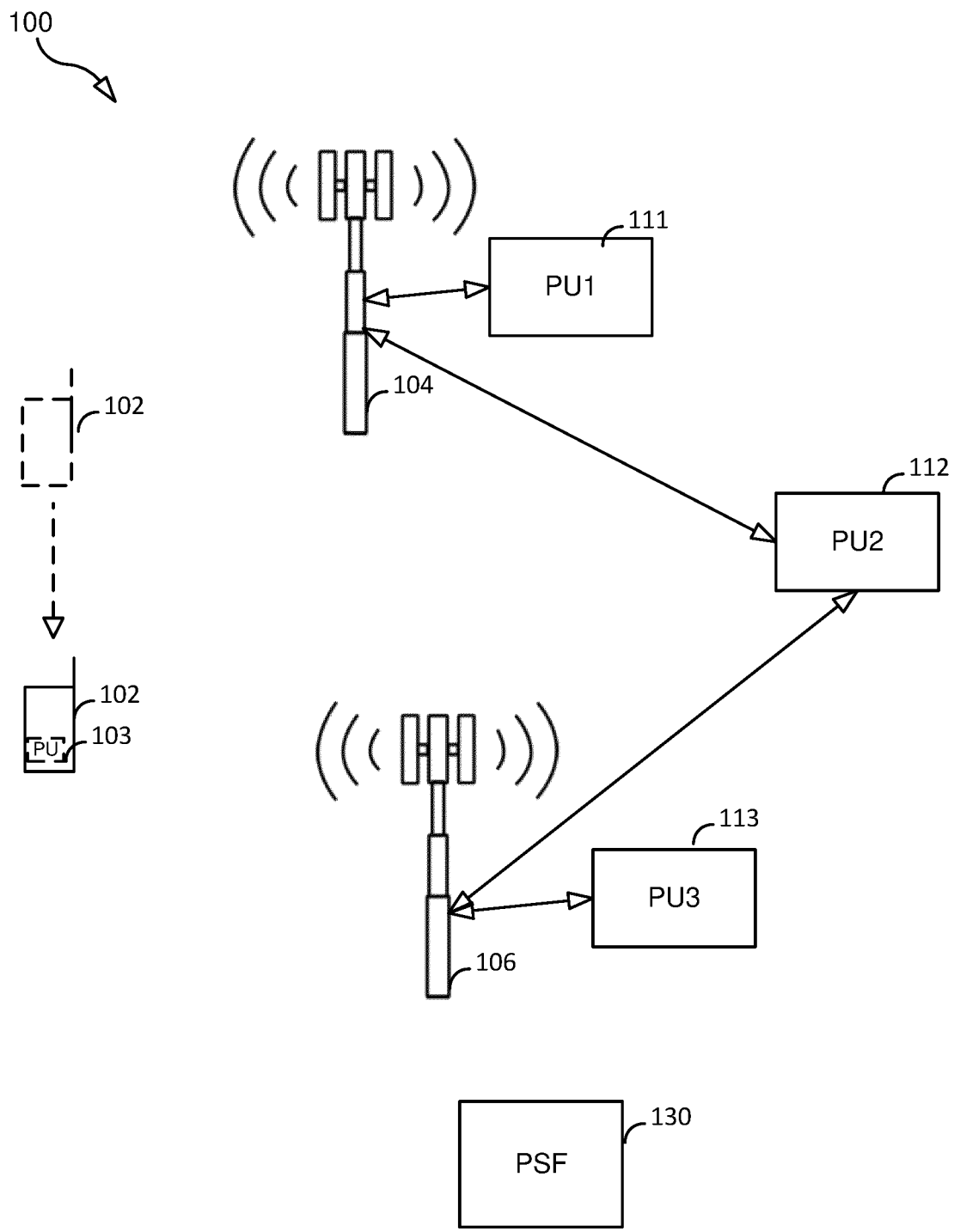
FIG. 1 illustrates a communication system according to an embodiment.

FIG. 1 illustrates a communication system 100 according to an embodiment. In the example shown, communication system includes a UE 102, a set of base stations (base station 104 and base station 106), a set of "remote" PUs (PU 111, PU 112, PU 113) (the PUs are "remote" from the UE's perspective), and a PU selection function (PSF) 130. A person of skill in the art would recognize that FIG. 1 is illustrative only and that communication system 100 may include any number of UEs, base stations, PUs, and PU selection functions. As used herein, a user equipment (UE) is any device capable of communicating (wirelessly or non-wirelessly) with a remote PU directly or indirectly via an access network. Examples of a UE include: a smartphone, a home computer, a head-mounted display (HMD), a gaming console, a streaming device, a tablet, an appliance, a sensor, a vehicle, a gateway, a router, etc.). In the example illustrated, UE 102 is mobile and can move from the coverage area of base station 104 to the coverage area of base station 106 (these coverage areas may partially or fully overlap). However, in other embodiments UE 102 may be fixed.

Further, as used herein a "base station" is any access point that provides network connectivity to a UE. Such access points include, but are not limited to: 3GPP LTE base stations (usually denoted "eNB"); 3GPP NR base stations (usually denoted "gNB"); and non-3GPP base stations (e.g., wireless local area network (WLAN) access points).

For expositional purposes, assume that UE 102 is running a gaming application that is operable to be served by a remote PU. For example, the gaming application is operable to 1) provide to the remote PU user input information (UII) specifying one or more actions the user of the UE has performed and 2) receive video frames rendered by the remote PU, which video frames may be rendered based on the UII. As illustrated in FIG. 1, the gaming application can be served by any one or more of remote PU 111, remote PU 112, or remote PU 113. Additionally, UE 102 may contain a local PU 103 that can serve the gaming application (e.g., the local PU can perform all the video rendering).

Figure 2:
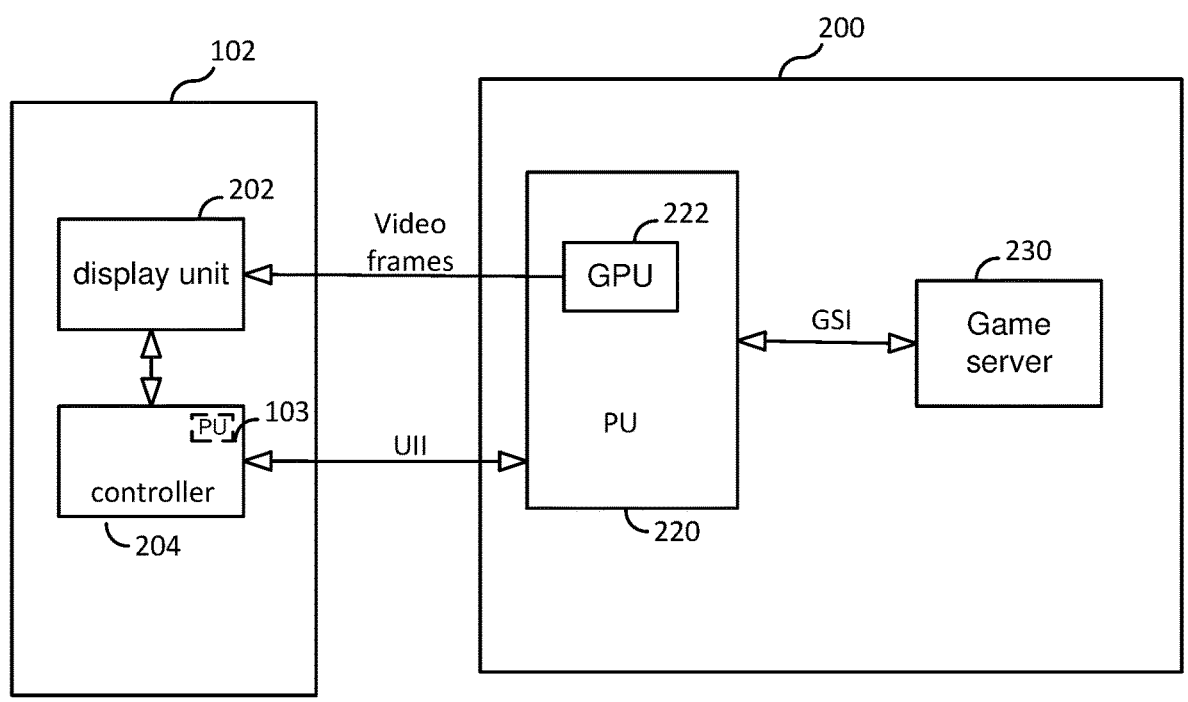
FIG. 2 illustrates a gaming system according to an embodiment.

FIG. 2 illustrates UE 102 communicating with a gaming system 200. In the example shown, UE 102 includes a display unit 202 and a control unit 204. Gaming system 200 includes a PU 220 comprising a GPU 222 and game server 230. Any one of remote PUs 111, 112, 113 may implement PU 220. GPU 222 functions to render video frames, which are then transmitted to UE 102 and processed by display unit 202 (e.g., display unit 202 receives the video frames and displays corresponding images on a display device of the UE). Control unit 204 functions to detect user actions (e.g., movements of the user or the user activating a control) and to provide to PU 220 user input information (UII) specifying one or more actions the user of the UE has performed. This user input information may be used by GPU 222 to render the video frames and it may be forwarded to game server 230. Additionally, game server 230 may forward to PU 220 game state information (GSI) (which may include UTI related to other users), and GPU 222 may also use this game state information to render the video frames.

As FIG. 2 illustrates, either game-state (the whole game) or information that is needed to render the video frames can be provided to the PU 220. Accordingly, the game rendering can be moved completely to the PU 220 (which may be in or near a base station), thereby allowing the UE 102 to be used only for controls and as the display.

Because a UE's battery life is a significant concern, the user of the UE may prefer to have the gaming application be served by a remote PU rather than the local PU 103, provided, of course, that the user's QoE will not be significantly impacted in a negative way. Accordingly, this disclosure provides a PU selection function 130 that performs a process for selecting a PU to serve a UE from a set of two or more available PUs (e.g., a set of PUs that includes the remote PUs 111, 112, 113 and the UE's local PU 103). While PU selection function 130 is shown in FIG. 1 as being separate from the base station, in some embodiments, each base station may have a PU selection function 130.

That is, in the gaming example, PU selection function 130 chooses which PU should render the video frames for the game (and if some state has to be moved prematurely if the user is going by subway etc. which is very easy to predict). In some embodiments, PUs that a network operator owns and that are situated in the base station can be made available for "gold-level customers" that pay a little extra for that lower delay. They are probably quite fast as well.

In one embodiment, when selecting a PU for UE 102, PU selection function 130 takes into account the following parameters: the frame budget (i.e., 1/framerate) for the UE, network transfer times for control signals (e.g., signals containing UII), network transfer time for video frames, and, for each available PU, the estimated time it takes the PU to render a frame at a certain resolution and fidelity. As an example, Table 1 below shows the available data that may be used by PU selection function to select a PU.

TABLE 1

| | |
|---|---|
| UE specific data | Requested fidelity level [low, medium, high]; Requested resolution [1440 p, 720 p] Maximum frame rate (e.g., 60, 90, or 120 frames-per-second) Remaining battery life |
| Local PU | Rending time for each possible resolution and fidelity combination Current Load of the local PU Estimated future load Priority value |
| Remote PU specific data (PU ID) | Rending time for each possible resolution and fidelity combination Current Load of the remote PU Encoding Delay Priority value Cell-IDs (i.e., list of one or more cell-ids that identify the cells that the PU is available to serve) For each cell-ID, a network delay value indicating the measured/estimated latency between the remote PU and the base station serving the identified cell |

As the above table demonstrates, each cell ID is associated with a set of available PUs that can serve UE's that are in the cell identified by the cell ID. That is, each cell ID can have its own list of PUs with measured/estimated latency between base station and the PU. Some PU performance number is also attached to estimate the time to render a frame for the current application and settings (resolution and fidelity is combined with the application type to create a complexity number). A performance number can be taken from databases with PU tests or a reference render run with a specific image with a specific resolution can be run when the PU is added to the computing pool. This performance number is used as a benchmark to calculate the rendering time for the specific PU, scaled for the wanted resolution and application complexity. Another performance-related measure may consider PU or PU-cluster allocation/load.

To enable mobility, the information about each available PU should be updated quite frequently because the load and network delays can fluctuate greatly over short periods of time. In one embodiment, a PU that is about to expire (due to planned outage or predicted usage based on previous local usage) can send a push-notice to the PU selection function so that the PU selection function can remove the PU from the table of available PUs. The list of available PUs may also be prioritized/sorted w.r.t. to a priority value, a load measure, a network delay measure, or any combination thereof, making a non-loaded PU with a favorable delay value more prone for selection.

When the PU selection function (PSF) 130 detects that UE 102 is about to be handed over from a source base station (the UE's current serving base station) to a target base station, PU selection function 130, in anticipation of the handover, may select one of more PUs and prepare the selected PUs to serve the UE (this might lead to the PU selection function 130 setting up multiple PUs when detecting a probable handover). For example, in some embodiments, after PU selection function 130 selects a new PU for UE 102, the current rendering session is cloned to the selected PU so that future video frames can be rendered in parallel by the existing PU and the newly selected PU and buffered. In such an embodiment, after the handover has completed, the UE switches to the buffered frames already located in the new base station/radio buffer. That is, not only is ordinary base station buffer status to target base station at handover, but also to forwards (or pre-render) PU-data at the new base station or the selected PU after handover. These features is illustrated in the message flow diagram shown in FIG. 3.

Figure 3:
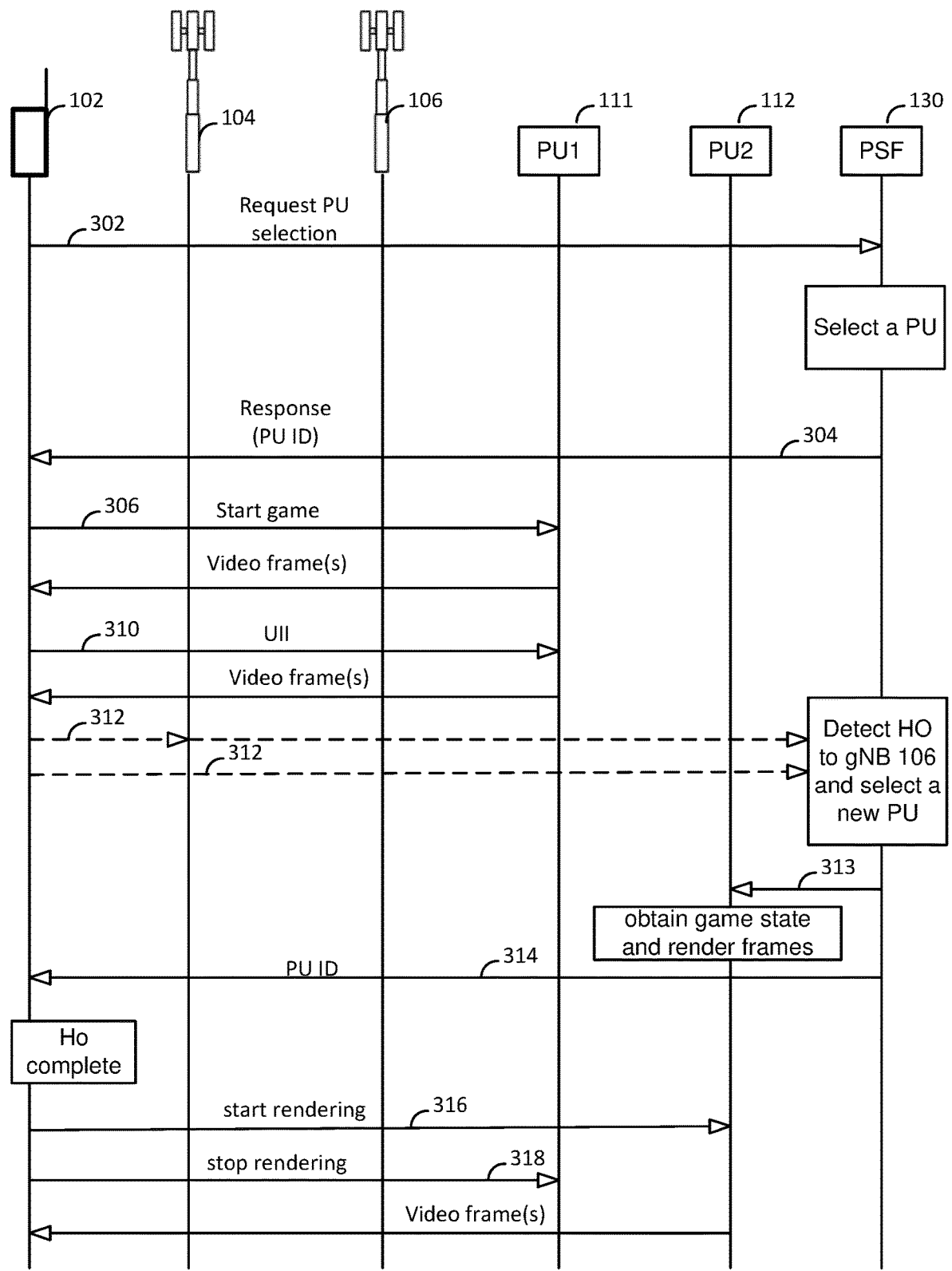
FIG. 3 is a message flow diagram illustrating a message flow according to an embodiment.

As shown in FIG. 3, in one embodiment, UE 102 transmits a PU selection request message 302 to PSF 130. This PU selection request message 302 may include one or more of the following parameter values: cell ID identifying the UE 102's current serving cell, framerate, resolution, fidelity, and remaining battery life. Additionally, if UE 102 has a local PU 103, the message 302 may further include the following parameters values for the local PU: a rendering time, current load, estimated future load, and priority value.

In response to receiving message 302, PSF 130 uses the cell ID value to determine a set of available remote PUs (i.e., the PUs that are associated with the cell ID) and to obtain performance information for each of the available remote PUs. Based on the obtained performance information and the information obtained from message 302, PSF 130 selects a best PU for the UE 102. In this example, PSF 130 selects PU1.

After selecting a PU, PSF 130 transmits to UE 102 a response message 304 that contains a PU ID that identifies the selected PU. The PU ID may be the network address (e.g., IP address, domain name (DN), etc.) of the selected PU. After receiving message 304, UE 102 transmits to PU1 a start game message 306. The start game message may include the following parameter values: game ID, framerate, resolution, and fidelity.

In response to receiving start game message 306, PU1 may obtain game state information from game server 230 and then starts generating video frames for the game based on the game state information and one or more parameters values from message 306 (e.g., PU1 renders the vide frames in accordance with the resolution and/or fidelity value included in message 306). When the user performs an action, UE 102 may transmit user input information (UII) 310 to PU1 so that PU1 can use the UII to generate updated video frames.

At some point while the user is playing the game, UE 102 may transmit a message 312 (e.g., measurement report), which in this example initiates a base station and/or PU handover for UE 102 (e.g., a handover of the UE 102 from base station 104 to base station 106 and/or a handover of the UE 102 from PU1 to PU2). For example, the user may move to a new location and this event may trigger UE 102 to transmit message 312, which may be an RRC message (e.g., a mobility measurement report that indicates that UE has detected a 3GPP measurement reporting event (e.g., an A3 event)). As another example, message 312 is a PU quality measurement report that indicates that the UE 102 has detected a PU related event.

Advantageously, in some embodiments, PSF 106 is configured to detect that a handover condition exists for UE 102 (e.g., PSF 106 detects that a base station and/or PU handover is required for UE 102) by, for example, receiving and processing message 312 (or certain information contained therein or derived therefrom). For example, in some embodiments, UE 102 transmits message 312 to base station 104, and, if PSF 130 is not a component of base station 104, then base station 104 forwards message 312 to PSF 130. If PSF 130 is a component of base station 104 and the message 312 is a Radio Resource Control (RRC) measurement report, then the RRC layer of base station 104 provides the measurement report (or information therefrom) to PSF 130. In other embodiments message 312 is an application layer message that UE 102 transmits to PSF 130.

In response to detecting that a handover may be required, PSF 130 may select a new PU to serve UE 102. For example, when PSF 130 determines that UE 102 will be handed over from a cell of base station 104 to a cell of base station 106, PSF 130 determine a set of available remote PUs that are associated with the cell of base station 106 (e.g., the PUs that are associated with the cell ID of the cell) and to obtain performance information for each of the available remote PUs. Based on the obtained performance information and the information obtained from message 302, PSF 130 selects a best PU for the UE 102. In this example, PSF 130 selects PU2.

After selecting PU2, PSF 130 transmits to PU2 a setup message 313 (a.k.a., PU handover message) so that PU2 will be prepared to start rendering video frames for UE 102. Setup message 313 may contain the game identifier so that PU2 can query game server 230 for the game state information for the identified game. Also the setup message may contain a PU ID that identifies PU1 (the PU ID may be the network address of PU1) so that PU2 can query PU1 for game state information. Once PU2 obtains the necessary game state information from game server 230 and/or PU1, PU2 can start rendering video frames for the game and can either buffer these frames or transmit them towards UE 102 via base station 106 so that the fames may be buffered by base station 106 until UE 102 establishes a connection with base station 106.

Additionally, at the same time PSF 130 transmits the setup message 313 to PU2, PSF 130 transmits to UE 102 a PU handover message 314 that contains the PU ID of PU2. In some embodiments, this message 314 from PSF 130 triggers UE 102 to transmit a start rendering message 316 to PU2, and it may also trigger UE 102 to transmit to PU1 a stop rendering message 318. After PU2 receives start rendering message 316, PU2 renders video frames for UE 102. In some embodiments, UE 102 transmits message 316 and 318 in response to detecting that the handover from the cell of base station 104 to the cell of base station 108 has completed.

Pre-Loading Resources

In some embodiments, if PSF 130 knows something about the travelling route of UE 102 (going to work the same route every day, sitting on a train/bus after buying a ticket, etc.), the probable PUs along that route could be preconfigured with software and game state information (e.g., game textures etc.) already loaded into PU memory so setup is minimal. The user may need to pay extra for this pre-loading service.

Process for Selecting a PU

In one embodiment, PSF 130 performs a PU selection process that involves traversing the list of available PUs in quality order (first all fidelity levels of the highest resolution and then the corresponding fidelity list in the lower resolution). This creates a list [S] of the estimated total rendering, and transmission times, for each solution in decreasing order (total time=rendering+cell-to-gpu latency+radio link latency). The first solution that fits into the frame budget gets chosen. The local PU 130 is also included in this list, with only the rendering time used then. A list of one or more fallback PUs is saved at the UE 102 or base station so the stream can as quickly as possible switch if a PU is lost from the network for some reason (e.g., someone turning off their computer at home). If the best rendering option fits the budget of a higher, optional framerate, that could be used instead.

In some embodiments, it is not allowed to change PUs too often, as this could create blinking effects. Accordingly, in some embodiments there is switching hysteresis in place for both times when to switch up in PU quality and switch down in PU quality.

Other Usage of PU Rendering Performance Lists

In some embodiments, the network resources required by UE 102 can be separated into communication resources associated with the cellular connectivity for UE 102 and PU processing resources (e.g., GPU processing resources associated with rendering video frames for UE 102 or TPU processing resources associated with producing inferences for UE 102).

It may furthermore be plausible that communication resources and PU resources may or may not be located at one specific base station. For example, it may be the case that both base station 104 and base station 106 may provide sufficient communication resources for UE 102 (e.g., in terms of uplink or downlink throughput, latency, etc.), but that, for example, only the base station 106 is associated with a PU (e.g., PU3 113) that is able provide enough processing capabilities for UE 102. Accordingly, this disclosure recognizes that communication system 100 may benefit from having a means to initiate a UE handover from one base station providing good radio connectivity but poor associated PU processing to another base station that has sufficiently good radio conditions and better PU capabilities. Accordingly, in one embodiment, a mobility-action may be motivated not only from a radio connectivity (e.g., signal strength) aspect, but also from whatever PU performance that can or cannot be provided.

In one use case, a UE requiring PU rendering (in terms of, for example, total or partial rendering offloading) may detect consistent and good radio conditions and by that not trigger any radio measurement reporting event (e.g., Measurement Report Event A3) to its serving base station. Accordingly, based solely on the UE's radio network conditions, the UE would not be considered for any base station to base station handover (mobility). However, it may be the case that the PU currently serving the UE is not performing well (e.g., not able to meet the UE's budget requirements—e.g. in terms of increasing rendering delay or decreased resolution, or similar) as a result of, for example, increased demand by the UE or other UEs that are being served by the PU, thereby exhausting the PU's processing resources.

Accordingly, this disclosure describes UE handover based on PU key performance indicators (KPIs). One approach to facilitate PU KPI-based device mobility is to extend the currently specified 3GPP UE reporting mechanism used for physical mobility (radio handover) purposes to take into account PU information so that a UE transfer between base stations (or cells) can be invoked both with respect to ordinary radio resource handling and the UE's PU requirements. Accordingly, in one embodiment the existing RRC Measurement Report framework is extended to consider, for example, PU metrics such as frame rate, rendering delay (total, within N node steps, etc.), rendering processing memory (total, consecutive, etc.), etc.

For example, the currently specified RRC Measurement Report Events A1, 2, 3, 4, 5, B1, 2, . . . may be complemented with a set of PU-related events G1, G2, Gi, etc., so that a PU-KPI condition may trigger a RRC Measurement Report Event Gi reflecting a PU-related condition that should be addressed. Alternatively, that another alike to radio-triggered Events, something like PUQualityMeasurementReport Event G1,2,3, . . . is defined so that a UE that detects fulfilment of certain metric-constraints may trigger transmission of the PU quality measurement report to its currently serving base station. The PU events may, for example, relate to:

G1: Aspects of rendering frame rate
G2: Aspects of rendering delay
G3: Aspects of PU rendering node processing memory
Gi: etc.

Furthermore, based on reception and interpretation of any PU-related event from the UE, either through an Event Gi in scope of today's RRC Measurement Report Event or via some new defined PUQualityMeasurementReport Event Gi, the UE's serving base station may decide to initiate a UE handover in the cellular domain so that the device is to be managed by a base station that has sufficient PU resources available (or associated). In further aspects, a device-measure that triggers an Event Gi report may be e.g. related to e.g. current PU-provided rendering frame rate, rendering delay, for example:

G2a—PU measure X at source base station>threshold (+offset)
G2b—PU measure X at source base station<threshold (+offset)
G2c—PU measure X at source base station>threshold, and been so during TimerPU.

Upon reception of said Event Gi provided from the UE, the UE's serving (source) base station may start preparing for a cellular handover of the UE to a target (from radio perspective accessible) base station.

For example, in one embodiment, the serving base station provides to the target base station information related to the UE's "cellular connectivity" resource requirements (according to 3GPP procedures) and PU resource requirements. In one embodiment, the serving base station provides this information to the target base station in an X2AP message (e.g., X2AP Resource Status Request message). Upon receiving the information from the serving base station, the target base station will decide whether it is able to satisfy the UE's requirements (cellular and PU) and transmit to the serving base station either a positive acknowledgement (ACK) indicating that the target base station and meet the requirement or a negative acknowledgement (NACK) indicating the opposite. For instance, the target base station responds to the X2AP Resource Status Request message by transmitting to the serving base station an X2AP Resource Status Response message that includes the ACK/NACK. After receiving the response from the target base station, the source base station decides whether to continue the handover procedure.

In another embodiment, the serving base station locally stores information on neighboring base stations available (local or associated) PU resources. Accordingly, in this embodiment the serving base station need not send to the target base station the status request message, but rather the serving base station decides whether to continue the handover procedure based on the information that it has locally stored. That is, based on the information that the serving base station has about the target base stations available PU resources, the serving base station evaluates if the UE's ongoing PU resource requirements may be fulfilled by PU resources available to the target base station.

In one embodiment, after deciding to continue the handover procedure, the serving base station transmits a handover request to the target base station, and, assuming the target responds with an ACK, the serving base station instructs the UE to commence with change of its serving base station to the target. In some embodiments, the serving base station so instructs the UE by transmitting to the UE an RRC Connection Reconfiguration Request. In some embodiments, after initiating the handover, the serving base station provides to the target base station: PU-related buffer content for the target base station to consider for starting PU rendering and information of what future position (frame) in data the data flow to the device should be swapped.

In another embodiment, rather than having the serving base station decide whether to perform the handover after receiving a report from the UE, the serving base station may obtain PU resource information for the target base station from either a locally stored database or from the target base station itself (e.g., over the X2 interface), and provide to the UE the obtained PU resource information using, for example, dedicated (RRC) signaling. This "other than serving base station PU information" in combination with already existing radio measurement information (e.g., Reference Signal Received Power (RSPR) and/or Reference Signal Received Quality (RSRQ) as is used for legacy mobility evaluations) may be used by the UE to conduct a more detailed and joint "signal strength and PU-resource availability" evaluation, and based on that, trigger a joint "RRNI+PU"-MeasurementReport Event that may be subject to a tradeoff between quality of the cellular connectivity available with source/target base station and whatever PU resource respective source/target base station may provide. That is, the UE itself decides whether to initiate a handover from the serving to the target based not only on the radio signal conditions at the serving and target base stations, but also based on the PU conditions at the serving and target base stations. Accordingly, the UE may consider if it is worth moving from serving to target given an achievable improvement of a PU-related metric of x % (e.g. reduced latency, higher resolution, higher frame rate, etc.) in comparison to a potential reduction of y dB RSRP/RSRQ where the latter would impairing the cellular connectivity. For instance, if x % is greater than a first threshold and y dB is less than a second threshold, then UE will decide to initiate the handover from the serving to the target.

Feedback from Network to UE

As a separate step, in the event that there are not available PUs that can meet the UE's current PU requirements, the network could communicate to the UE (or directly to the PU serving the UE) that it needs to lower its requirements (e.g., choose a lower video resolution, framerate, and/or fidelity, et.c). When none of the available PUs (including the local PU, if any) can handle the rendering and delay budget, lowering the quality/resolution is a suitable action to make it so that at least one of the PUs can satisfy the UE's rendering budget constraints.

Car as UE

In another use case, the UE could be a car (or a component of a car) that is in need of edge computational resources in the form of a PU for machine learning model inference (e.g., a TPU), or other applications. The prioritization and scheduling algorithm would work the same way but with other deadlines and system performances depending on the computation needed. Inference time (per second) could replace estimated framerate, and so on. This is practicable especially if the model is using some kind of open model (ResNet, ImageNet etc.) that are benchmarked on hundreds of different kinds of hardware already, providing a great database to make proper computation time estimates. The application in the car can even be to display 3D graphics in the heads-up-display (HUD) of the car, and then the algorithm would be exactly the same as in the "gaming" example previously.

Figure 4:
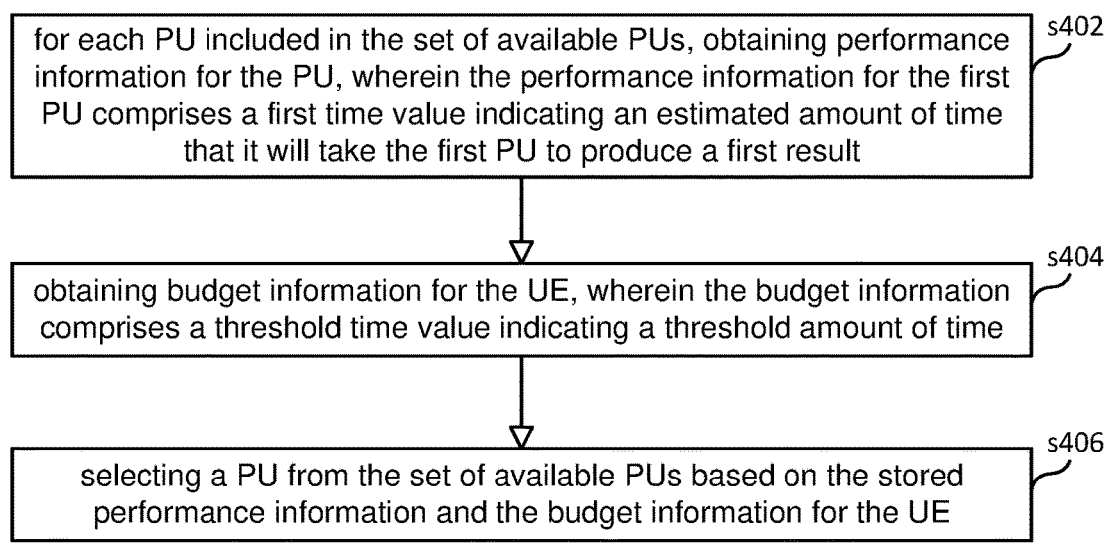
FIG. 4 is a flowchart illustrating a process according to an embodiment.

FIG. 4 is a flowchart illustrating a process 400, according to an embodiment, for selecting from a set of two or more available PUs (e.g. a set of GPUs or a set of TPUs) a PU to serve a UE (e.g., UE 102). Process 400 may be performed by PSF 130 and may begin in step s402. Step s402 comprises, for each PU included in the set of available PUs, obtaining performance information for the PU, wherein the performance information for a first PU included in the set of PUs comprises a first time value indicating an estimated amount of time that it will take the first PU to produce a first result (e.g., an estimated amount of time that it will take the first PU to render a video frame for produce an inference). Step s404 comprises obtaining budget information for the UE, wherein the budget information comprises a threshold time value indicating a threshold amount of time. Step s406 comprises selecting a PU from the set of available PUs based on the stored performance information and the budget information for the UE.

In some embodiments, the first time value indicates an estimated amount of time to render a video frame having a first resolution and/or first fidelity. In some embodiments, the threshold time value is based on a video framerate. In some embodiments, wherein the threshold is equal to the reciprocal of the video framerate.

In some embodiments, selecting a PU from the set of available PUs comprises determining whether or not to select the first PU. In some embodiments, the first UE has a battery and the first PU is a component of the UE that consumes electrical energy produced by the battery, and the step of determining whether or not to select the first PU comprises determining the current capacity of the battery (i.e., remaining battery life) and determining whether or not to select the first PU based on the determined current capacity of the battery.

In some embodiments, the first PU is remote from the UE, and the performance information for the first PU further comprises a latency value indicating a latency associated with the first PU, wherein the latency value is based on a network delay and/or an encoding delay.

In some embodiments, the first time value indicates an estimated amount of time that it will take the first PU to render a video frame having a first resolution or first fidelity level, and the performance information for the first PU further comprises a second time value indicating an estimated amount of time that it will take the first PU to render a video frame having a second resolution or second fidelity level.

In some embodiments, process 400 further includes receiving a message (e.g., message 312) generated by an application running on the UE, wherein the step of selecting a PU from the set of available PUs is performed in response to receiving the message. In some embodiments, the message includes the budget information. In some embodiments, the message further includes reference signal measurement information (e.g., RSRP and/or RSRQ values) for a set of available cells, the reference signal measurement information comprising first reference signal measurement information for a first cell and second reference signal measurement information for a second cell, and the process further includes: i) in response to receiving the message, selecting, based on the reference signal measurement information, a cell from the set of available cells and ii) transmitting a response message (e.g., message 314) to the UE comprising PU identifier information identifying the selected PU (the message may also contain cell identifier information identifying the selected cell).

In some embodiments, process 400 also includes detecting that a handover condition exists for the UE, wherein the step of selecting a PU from the set of available PUs is performed as a result of detecting that the handover condition exists for the UE. In such an embodiment, process 400 may further include determining a target cell for the UE; and prior to selecting a PU from the set of available PUs, determining the set of available PUs, wherein determining the set of available PUs comprises determining PUs that are associated with the target cell. In some embodiments, detecting that a handover condition exists for the UE comprises receiving a PU quality measurement report transmitted by the UE, wherein the PU quality measurement report indicates that the UE has detected a PU related event (e.g., event G2s). In some embodiments, the PU quality measurement report comprises information indicating that a key performance indicator, KPI, for a PU currently serving the UE has met a criteria (e.g., the KPI exceeds a threshold or has fallen below a threshold). In some embodiments, receiving the PU quality measurement report comprises receiving a Radio Resource Control (RRC) Measurement Report message comprising the PU quality measurement report.

In some embodiments, process 400 further includes, after selecting a PU, sending to the UE a message (e.g., message 314) comprising PU identifier information identifying the selected PU (e.g., a Fully Qualified DN (FQDN) or IP address for the selected PU).

In some embodiments, process 400 further includes, after selecting a PU, sending to the selected PU a PU handover message (e.g., message 313) comprising information identifying a serving PU currently serving the UE, wherein the PU handover message triggers the selected PU to retrieve from the serving PU state information associated with the UE. In some embodiments, the PU handover message further triggers the selected PU to use the PU station information to produce a result (e.g., a video frame) and to transmit the result towards the UE.

In some embodiments, the method is performed by PU selection function of a base station serving the UE. In other embodiments, the UE obtains network access via a serving base station, and the method is performed by a PU selection function of a node that is remote from the UE and remote from the base station.

Figure 5:
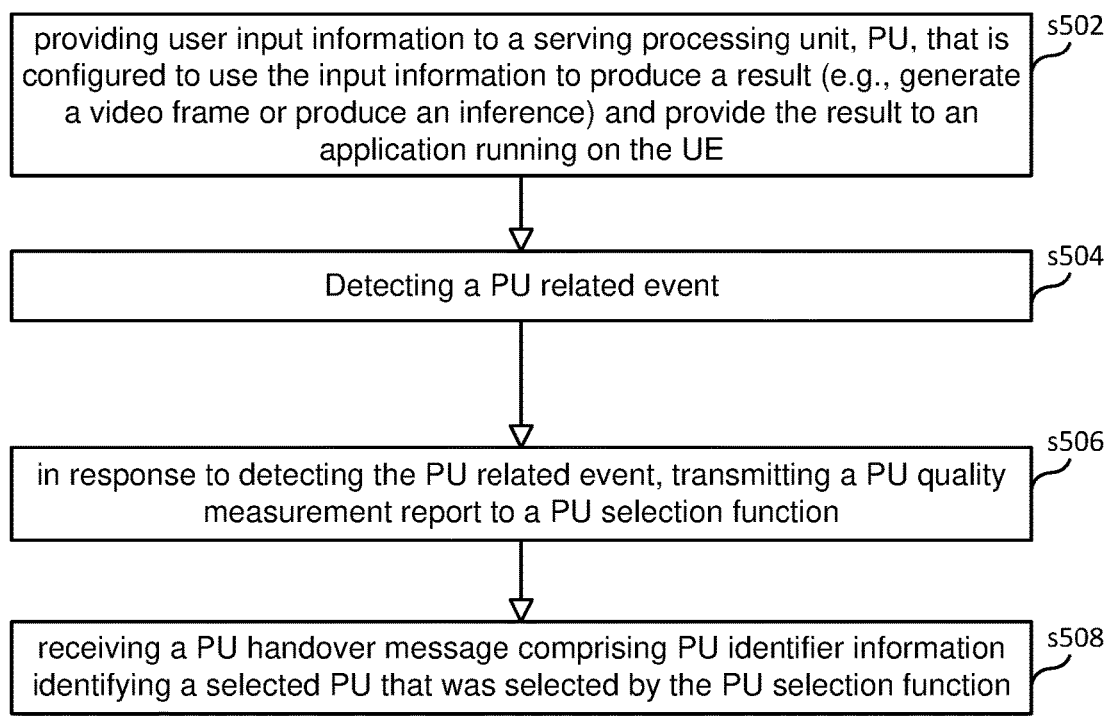
FIG. 5 is a flowchart illustrating a process according to an embodiment.

FIG. 5 is a flowchart illustrating a process 500, according to an embodiment, that is performed by a UE (e.g., UE 102). Process 500 may begin in step s502

Step s502 comprises the UE providing user input information (UII) to a serving PU that is configured to use the user input information to produce a result (e.g., generate a video frame or produce an inference) and provide the result to an application running on the UE. Step s504 comprises the UE detecting a PU related event. Step s506 comprises the UE, in response to detecting the PU related event, transmitting a PU quality measurement report to a PU selection function. Step s508 comprises the UE, after transmitting the PU quality measurement report to the PU selection function, receiving a PU handover message (e.g., message 314) comprising PU identifier information identifying a selected PU that was selected by the PU selection function.

In some embodiments, the PU quality measurement report comprises information indicating that a KPI for the serving PU has met a criteria (e.g., the KPI exceeds a threshold or has fallen below a threshold).

In some embodiments, transmitting the PU quality measurement report comprises transmitting an RRC Measurement Report message comprising the PU quality measurement report. In other embodiments, transmitting the PU quality measurement report comprises transmitting an application layer message comprising the PU quality measurement report.

In some embodiments, process 500 also includes the UE, after receiving the PU handover message, establishing a connection with the selected PU (e.g., transmitting message 316 to the selected PU) and terminating a connection with the serving PU (e.g., transmitting message 318 to the serving PU). In some embodiments, establishing the connection with the selected PU comprising transmitting to the selected PU a transport layer message (e.g., a TCP SYN message or a UDP message).

In some embodiments, the PU quality measurement report further comprises reference signal measurement information for a set of available cells, the reference signal measurement information comprising first reference signal measurement information for a first cell and second reference signal measurement information for a second cell, and the PU handover message further comprises cell identifier information identifying a selected cell selected by the PU selection function. In some embodiments, process 500 further includes the UE, after receiving the PU handover message, establishing an RRC connection with the selected cell.

Figure 6:
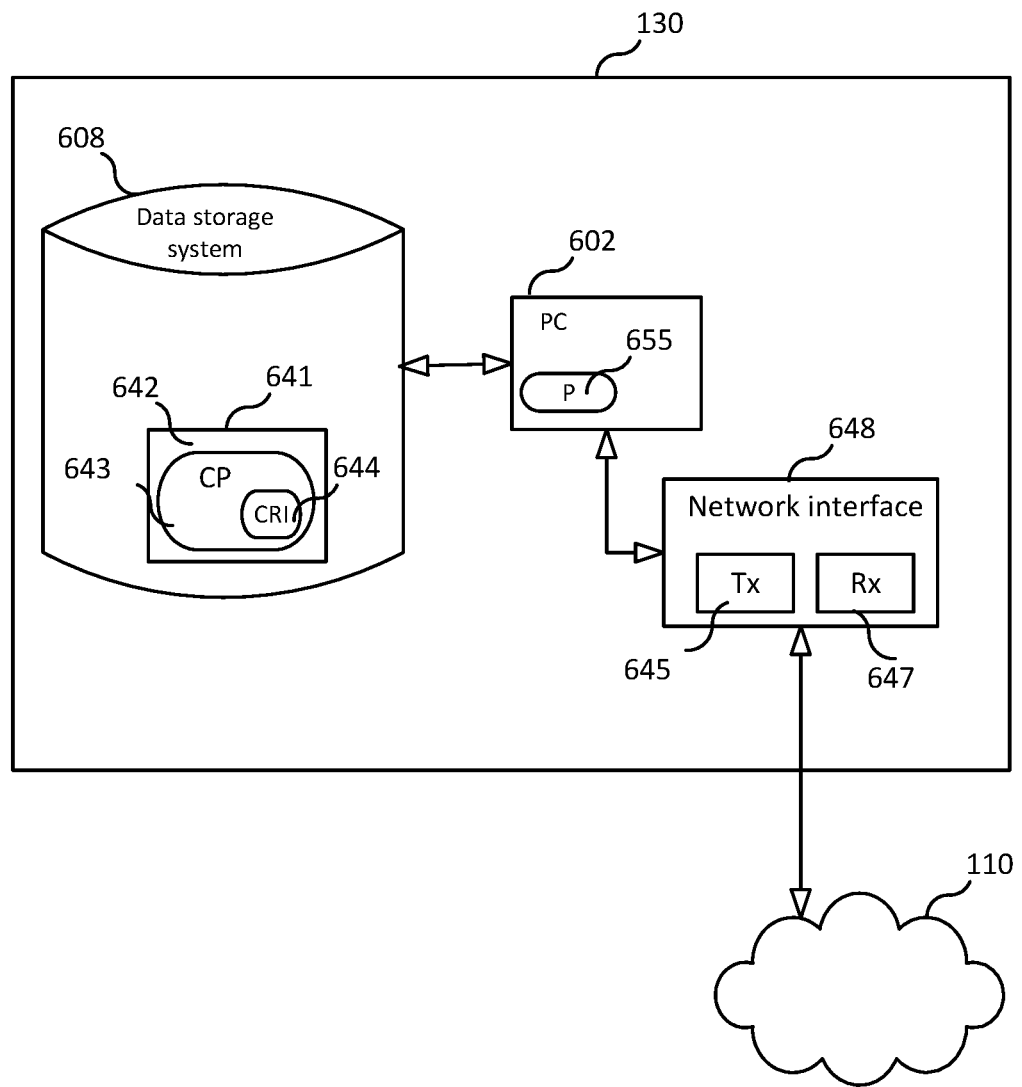
FIG. 6 is a block diagram a PU selection function according to an embodiment.

FIG. 6 is a block diagram of PSF 130, according to some embodiments. As shown in FIG. 6, PSF 130 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., PSF 130 may be a distributed computing apparatus); at least one network interface 648 (e.g., a physical interface or air interface) comprising a transmitter (Tx) 645 and a receiver (Rx) 647 for enabling PSF 130 to transmit data to and receive data from other nodes connected to a network 110 (e.g., an Internet Protocol (IP) network) to which network interface 648 is connected (physically or wirelessly) (e.g., network interface 648 may be coupled to an antenna arrangement comprising one or more antennas for enabling PSF 130 to wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes PSF 130 to perform steps described herein (e.g., steps described herein with reference to the flow charts). In other embodiments, PSF 130 may be configured to perform steps described herein without the need for code. That is, for example, PC 602 may consist merely of one or more ASICs. Hence, the features of the embodiments described herein may be implemented in hardware and/or software.

Figure 7:
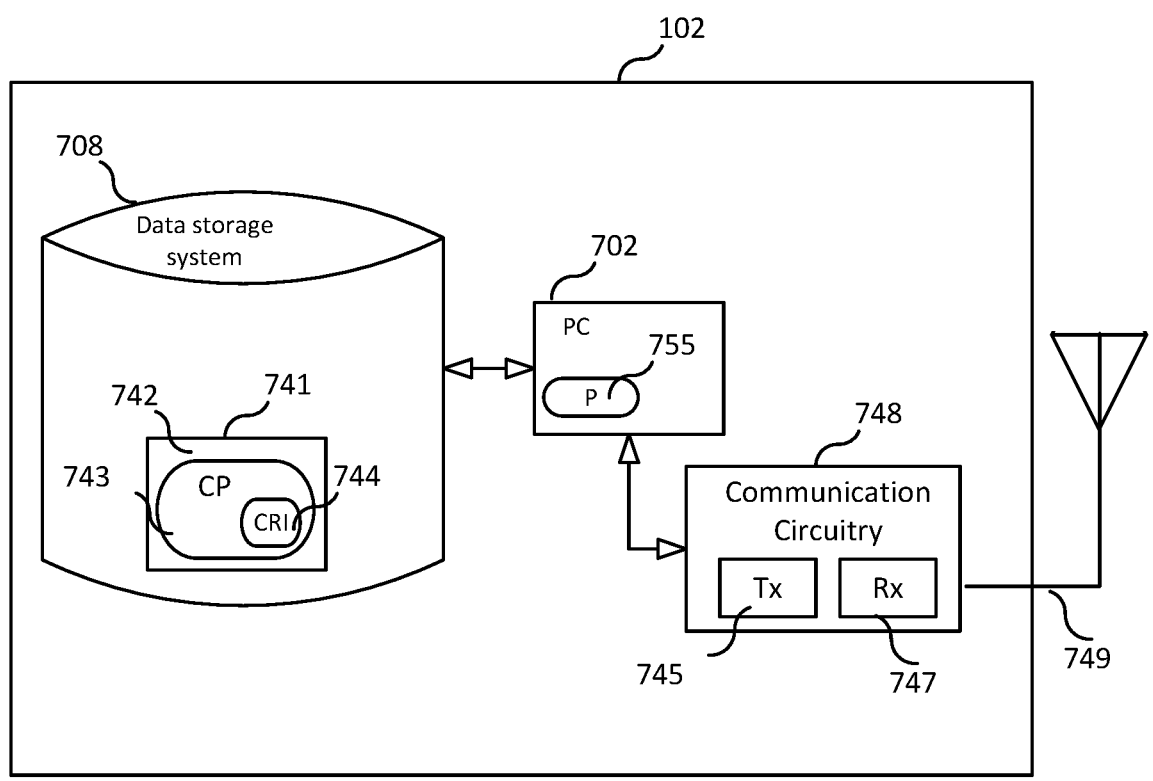
FIG. 7 is a block diagram of a UE according to an embodiment.

FIG. 7 is a block diagram of UE 102, according to some embodiments. As shown in FIG. 7, UE 102 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like); communication circuitry 748, which is coupled to an antenna arrangement 749 comprising one or more antennas and which comprises a transmitter (Tx) 745 and a receiver (Rx) 747 for enabling UE 102 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes UE 102 to perform steps described herein (e.g., steps described herein with reference to the flow charts). In other embodiments, UE 102 may be configured to perform steps described herein without the need for code. That is, for example, PC 702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for selecting, from a set of two or more available processing units (PUs), a PU to serve a user equipment, (UE), the set of available PUs comprising a first PU and a second PU, the method comprising:
   for each PU included in the set of available PUs, obtaining performance information for the PU, wherein the performance information for the first PU comprises a first time value indicating an estimated amount of time that it will take the first PU to produce a first result;
   obtaining budget information for the UE, wherein the budget information comprises a threshold time value indicating a threshold amount of time; and
   selecting a PU from the set of available PUs based on the stored performance information and the budget information for the UE.

2. The method of claim 1, wherein the first time value indicates an estimated amount of time to render a video frame having a first resolution and/or first fidelity.

3. The method of any one of claim 1, wherein the threshold time value is based on a video framerate.

4. The method of claim 3, wherein the threshold is equal to the reciprocal of the video framerate.

5. The method of claim 1, wherein the first time value indicates an estimated amount of time to produce an inference.

6. The method of claim 1, wherein selecting a PU from the set of available PUs comprises determining whether or not to select the first PU.

7. The method of claim 6, wherein
the first UE has a battery and the first PU is a component of the UE that consumes electrical energy produced by the battery, and
the step of determining whether or not to select the first PU comprises determining the current capacity of the battery and determining whether or not to select the first PU based on the determined current capacity of the battery.

8. The method of claim 6, wherein
the first PU is remote from the UE, and
the performance information for the first PU further comprises a latency value indicating a latency associated with the first PU, wherein the latency value is based on a network delay and/or an encoding delay.

9. The method of claim 1, wherein
the first time value indicates an estimated amount of time that it will take the first PU to render a video frame having a first resolution or first fidelity level, and
the performance information for the first PU further comprises a second time value indicating an estimated amount of time that it will take the first PU to render a video frame having a second resolution or second fidelity level.

10. The method of claim 1, further comprising receiving a message generated by an application running on the UE, wherein the step of selecting a PU from the set of available PUs is performed in response to receiving the message.

11. A method performed by a user equipment (UE), the method comprising:
providing user input information to a serving processing unit (PU) that is configured to use the user input information to produce a result and provide the result to an application running on the UE;
detecting a PU related event;
in response to detecting the PU related event, transmitting a PU quality measurement report to a PU selection function; and
after transmitting the PU quality measurement report to the PU selection function, receiving a PU handover message comprising PU identifier information identifying a selected PU that was selected by the PU selection function.

12. The method of claim 11, wherein the PU quality measurement report comprises information indicating that a key performance indicator (KPI) for the serving PU has met a criteria.

13. The method of claim 11, wherein transmitting the PU quality measurement report comprises transmitting a Radio Resource Control Measurement Report message comprising the PU quality measurement report.

14. The method of claim 11, wherein transmitting the PU quality measurement report comprises transmitting an application layer message comprising the PU quality measurement report.

15. The method of claim 11, further comprising:
after receiving the PU handover message, establishing a connection with the selected PU and terminating a connection with the serving PU.

16. The method of claim 15, wherein establishing the connection with the selected PU comprising transmitting to the selected PU a transport layer message.

17. A processing unit (PU) selection function (PSF), the PSF comprising:
processing circuitry; and
memory, the memory containing instructions executable by the processing circuitry, wherein the PSF is configured to:
for each PU included in a set of available PUs that includes at least a first PU and a second PU, obtaining performance information for the PU, wherein the performance information for the first PU comprises a first time value indicating an estimated amount of time that it will take the first PU to produce a first result;
obtaining budget information for a user equipment (UE), wherein the budget information comprises a threshold time value indicating a threshold amount of time; and
selecting a PU from the set of available PUs based on the stored performance information and the budget information for the UE.

18. A user equipment (UE), the UE comprising:
processing circuitry; and
memory, the memory containing instructions executable by the processing circuitry, wherein the UE is configured to perform a method comprising:
providing user input information to a serving processing unit, PU, that is configured to use the user input information to produce a result and provide the result to an application running on the UE;
detecting a PU related event;
in response to detecting the PU related event, transmitting a PU quality measurement report to a PU selection function, PSF; and
after transmitting the PU quality measurement report to the PSF, receiving a PU handover message comprising PU identifier information identifying a selected PU that was selected by the PU selection function.

\* \* \* \* \*